(12) United States Patent
Todori et al.

(10) Patent No.: US 6,738,335 B1
(45) Date of Patent: May 18, 2004

(54) OPTICAL RECORDING MEDIUM, REPRODUCING METHOD, AND REPRODUCING APPARATUS

(75) Inventors: Kenji Todori, Yokohama (JP); Toshihiko Nagase, Kawasaki (JP); Katsutaro Ichihara, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 715 days.

(21) Appl. No.: 09/606,177

(22) Filed: Jun. 29, 2000

(30) Foreign Application Priority Data

Jun. 30, 1999  (JP) .............................. 11-186535

(51) Int. Cl.[7] ................................. G11B 7/00
(52) U.S. Cl. ................. 369/94; 369/275.1; 369/288
(58) Field of Search .................. 369/53.21, 53.22, 369/53.27, 53.31, 53.41, 53.44, 101, 275.1, 275.4, 94, 44.26, 100, 283, 284, 288

(56) References Cited

U.S. PATENT DOCUMENTS

| | | | | |
|---|---|---|---|---|
| 5,625,609 A | * | 4/1997 | Latta et al. | ............... 369/44.23 |
| 5,726,970 A | | 3/1998 | Kaneko et al. | |
| 5,777,969 A | * | 7/1998 | Tomiyama et al. | ............ 369/94 |
| 5,858,498 A | * | 1/1999 | Ohkubo et al. | ........... 369/275.4 |
| 5,903,530 A | | 5/1999 | Tateishi et al. | |

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

This invention provides an optical recording medium having a structure in which a plurality of recording layers are stacked, and a reproducing method and apparatus for the medium. As an interlayer interposed between first and second recording layers, this invention uses a layer which guides converged light irradiating the first recording layer to the second recording layer such that the beam diameter on the second recording layer is substantially equal to the beam diameter on the first recording layer.

23 Claims, 3 Drawing Sheets

OPTICAL RECORDING MEDIUM, REPRODUCING METHOD, AND REPRODUCING APPARATUS

CROSS-REFERENCE TO RELATED APPLICATIONS

This application is based upon and claims the benefit of priority from the prior Japanese Patent Application No. 11-186535, filed Jun. 30, 1999, the entire contents of which are incorporated herein by reference.

BACKGROUND OF THE INVENTION

The present invention relates to an optical recording medium, a reproducing method, and a reproducing apparatus and, more particularly, to an optical recording medium having a structure in which a plurality of recording layers are stacked, and a reproducing method and apparatus for the medium.

Optical recording media such as optical disks are used in various forms. For example, as external storage media of computers and as music media, CDs (Compact Discs) such as CD-ROM (read only), CD-R (write-once), and CD-RW (rewritable) are extensively used. Also, DVDs (Digital Versatile Discs) are becoming popular as optical recording media having larger capacity and are used in video recording, in computer storaging, and the like in recent years. DVDs also have diverse types: DVD-ROM (read only), DVD-R (write-once), and DVD-RAM (rewritable).

Of these optical recording media, a read only medium, for example, has a recording layer in which pits having a depth ¼ the wavelength of a laser beam are formed as recording marks. When this pit is irradiated with a laser beam, the phase of reflected light from the pit shifts by ½ from that of reflected light from the periphery of the pit. Consequently, these reflected light components produce interference. Therefore, compared to the case in which a portion having no pit is irradiated with a laser beam, the intensity of reflected light detected by a photodetector lowers. A read only optical recording medium uses this principle in reproducing recorded information.

DVDs have a structure in which a pair of disks each having a thickness of 0.6 mm are adhered. A DVD in which recording layers are formed on both opposing surfaces of these disks is called a dual-layered DVD. Of such dual-layered DVDS, a DVD that allows information recorded in a pair of recording layers to be read out from one side is called a single-sided, dual-layered DVD.

Figure 1:
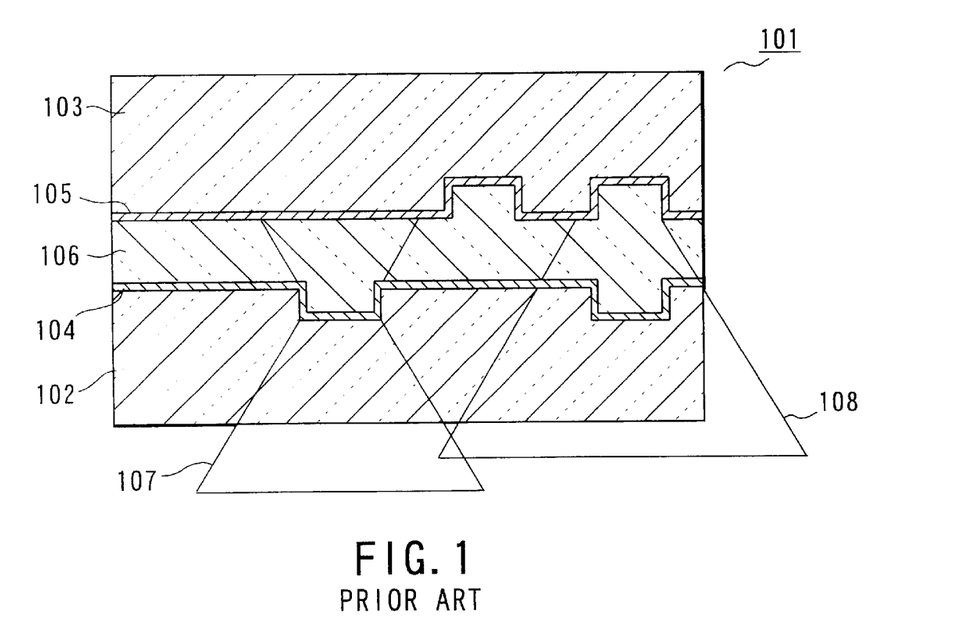
FIG. 1 is a sectional view schematically showing a conventional one-side, dual-layered DVD.

FIG. 1 is a sectional view schematically showing a conventional single-sided, dual-layered DVD. As shown in FIG. 1, this conventional single-sided, dual-layered DVD 101 has a structure in which a substrate 102 having a recording layer 104 on one principal surface and an opposing substrate 103 having a recording layer 105 on one principal surface are adhered via an interlayer 106 such that the recording layers 104 and 105 oppose each other. Note that the recording layer 104 is a semitransparent film and the recording layer 105 is a reflecting film.

Information recorded in the recording layer 104 of this conventional single-sided, dual-layered DVD 101 is read out by sending a laser beam 107, focused on the recording layer 104, from the side of the substrate 102, and detecting the intensity of the reflected light by a photodetector. Although reflected light from the recording layer 105 is also detected, the focal depth of this layer beam 107 is small, so the intensity of the reflected light from the recording layer 105 is much lower than that of the reflected light from the recording layer 104. Accordingly, only the information recorded in the recording layer 104 can be selectively read out.

On the other hand, to read out information recorded in the recording layer 105, a laser beam 108 focused on the recording layer 105 is sent from the side of the substrate 102. As in the above case, only the information recorded in the recording layer 105 can be selectively read out.

In this prior art as described above, in reading out information recorded in one of the recording layers 104 and 105, information recorded in the other is prevented from becoming noise by using the small focal depth of the laser beam used to read out information. This allows read-out of information recorded in the recording layers 104 and 105. Hence, in this prior art it is necessary to move the focal position of the laser beam.

To move the focal position, a mechanism for moving a lens must be incorporated into an optical disk drive. This significantly increases the time and cost necessary to manufacture the optical disk drive of this prior art. Also, when the focal position is thus moved, reading out recorded information naturally requires a long time. Accordingly, it is difficult for this prior art to realize a high read rate.

BRIEF SUMMARY OF THE INVENTION

It is an object of the present invention to make it possible to read out information recorded in a single-sided, multilayered optical recording medium at high speed.

It is another object of the present invention to reduce the cost and time required to manufacture a reproducing apparatus for a single-sided, multilayered optical recording medium.

According to the first aspect of the present invention, there is provided an optical recording medium using a reflectance difference to reproduce recorded information, comprising a first recording layer, an interlayer provided on one principal surface of the first recording layer, and a second recording layer provided on the interlayer, wherein the interlayer guides converged light irradiating the first recording layer to the second recording layer such that a beam diameter of the light on the second recording layer is substantially equal to a beam diameter of the light on the first recording layer.

According to the second aspect of the present invention, there is provided an optical recording medium using a reflectance difference to reproduce recorded information, comprising a first recording layer, an interlayer provided on one principal surface of the first recording layer and made of a third-order nonlinear optical material, and a second recording layer provided on the interlayer.

According to the third aspect of the present invention, there is provided an optical recording medium using a reflectance difference to reproduce recorded information, comprising a first recording layer, an interlayer provided on one principal surface of the first recording layer, and a second recording layer provided on the interlayer, wherein the interlayer comprises first and second portions juxtaposed on the first recording layer, and a refractive index of the second portion is higher than that of the first portion.

According to the fourth aspect of the present invention, there is provided a reproducing method of an optical recording medium comprising a first recording layer, an interlayer provided on one principal surface of the first recording layer, and a second layer provided on the interlayer, comprising the steps of irradiating the first recording layer with converged light, and detecting the intensity of reflected light produced by irradiation of the converged light, wherein the interlayer guides the converged light irradiating the first recording layer to the second recording layer such that a beam diameter of the light on the second recording layer is substantially equal to a beam diameter of the light on the first recording layer.

According to the fifth aspect of the present invention, there is provided a reproducing apparatus of an optical recording medium having a structure in which a plurality of recording layers are stacked, comprising an optical recording medium comprising a first recording layer, an interlayer provided on one principal surface of the first recording layer, and a second recording layer provided on the interlayer, a light source for irradiating the first recording layer with converged light, and a detector for detecting the intensity of reflected light produced by irradiation of the light, wherein the interlayer guides the converged light irradiating the first recording layer to the second recording layer such that a beam diameter of the light on the second recording layer is substantially equal to a beam diameter of the light on the first recording layer.

The term "reflectance" means a value actually measured by irradiating a reflector with light, when it is used like "the difference between reflectances" and "detect the reflectance". That is, when this is the case the reflectance not only changes in accordance with the wavelength of the light used and the material and thickness of the reflector but also is influenced by the shape of the reflector. Accordingly, "detect the reflectance of that portion of an optical recording medium, which is irradiated with converged light" is equivalent to "detect the energy or intensity of reflected light produced when the first recording layer is irradiated with converged light". Also, when the term "reflectance" is used in connection with a single thin flat film like "the reflectance of a first recording layer", this reflectance is uniquely determined only by the wavelength of the light used and the material and thickness of the thin film.

In the present invention as described above, converged light irradiating the first recording layer is guided to the second recording layer such that the beam diameter of the light on the first recording layer is equal to the beam diameter of the light on the second recording layer. This means that when this converged light is focused on the first recording layer, the light is also focused on the second recording layer at the same time. In the present invention, therefore, unlike the prior art, reflected light detected by the photodetector can contain light components reflected by the first and second recording layers respectively with sufficient intensities. Hence, by appropriately setting the light transmittance and the like of the first recording layer, it is possible to read out both information recorded in the first recording layer and information recorded in the second recording layer at the same time.

In the present invention, readout information is usually separated in accordance with information recorded in the first recording layer and information recorded in the second recording layer. However, information read out by the above method need not be separated. For example, when both first and second recording layers are used to record one information, i.e., when a recording mark pattern formed on the first recording layer and a recording mark pattern formed on the second recording layer are related, it is unnecessary to separate readout information.

In the present invention as described above, it is possible to simultaneously read out information recorded in the first recording layer and information recorded in the second recording layer without moving the focal position of converged light. Accordingly, the present invention can read out information recorded in a single-sided, multilayered optical recording medium at very high speed. Also, the present invention obviates the need for a mechanism for moving the focal position of converged light. This can reduce the cost and time required to manufacture a reproducing apparatus for a single-sided, multilayered optical recording medium.

In the present invention as described above, the interlayer guides converged light irradiating the first recording layer to the second recording layer such that the beam diameter on the second recording layer is substantially equal to the beam diameter on the first recording layer. This interlayer is made of, e.g., a third-order nonlinear optical material. The interlayer can also have first and second portions juxtaposed on the first recording layer, and the refractive index of the second portion can be higher than that of the first portion.

In the present invention, a reflectance $R_1$ of the first recording layer and a reflectance $R_2$ of the second recording layer preferably satisfy:

$0.1 < R_1 < 0.4$ $0.5 < R_2 \leq 1$, and $R_2 \neq R_1/(1-R_1)$

When this is the case, the reflected light intensity or reflectance detected changes between four values, and sufficient reflected light intensity is obtained. So, this is advantageous in separating readout information.

In the present invention, the first and second recording layers are preferably different from each other in at least one of a recording density and a recording method. In this case, readout information can be separated by using this difference.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in more detail below with reference to the accompanying drawings. Note that the same reference numerals denote the same or similar components in these drawings, and a duplicate explanation thereof will be omitted.

Figure 2:
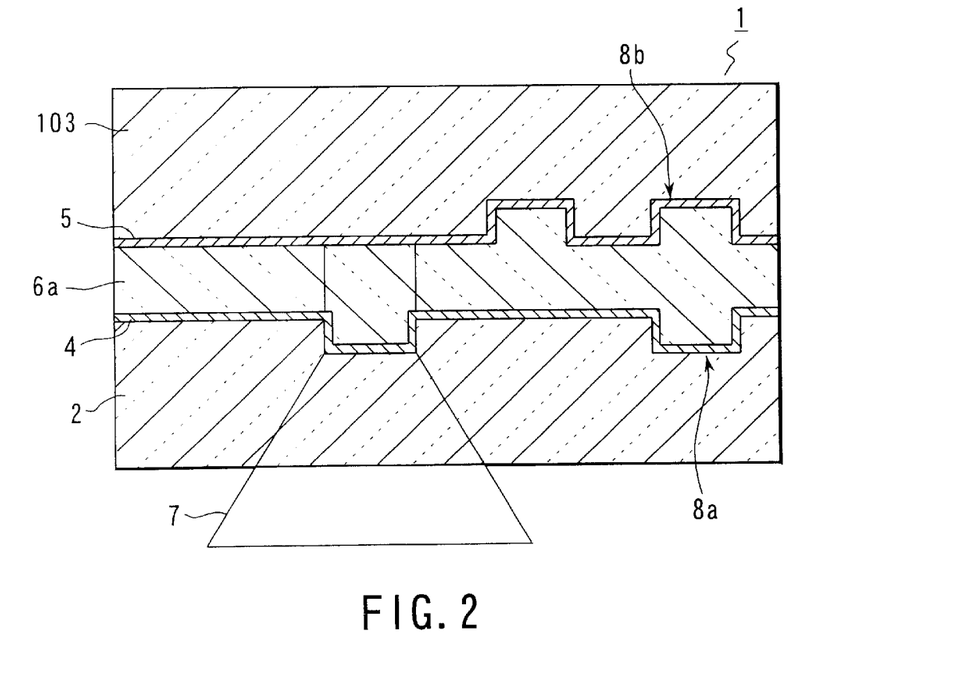
FIG. 2 is a sectional view schematically showing an optical recording medium according to the first embodiment of the present invention.

FIG. 2 is a sectional view schematically showing an optical recording medium according to the first embodiment of the present invention. An optical recording medium 1 shown in FIG. 2 is a single-sided, dual-layered read only optical disk. This optical disk 1 has a structure in which a transparent substrate 2 having a recording layer 4 on one principal surface and an opposing substrate 3 having a recording layer 5 on one principal surface are adhered via an interlayer 6a such that the recording layers 4 and 5 oppose each other. Information is read out from the optical disk 1 shown in FIG. 2 by sending a laser beam 7 from the side of the transparent substrate 2. Hence, the recording layer 4 is a semitransparent film, and the recording layer 5 is a reflecting film.

On the opposing surfaces of the transparent substrate 2 and the opposing substrate 3, pits 8a and 8b each bearing information "0" or "1" are formed. These pits 8a and 8b have a depth ¼ the wavelength of the laser beam 7 as reproducing light condensed by a lens (not shown).

Concentric or spiral groove portions are formed on the opposing surfaces of the transparent substrate 2 and the opposing substrate 3 to thereby define lands and grooves. FIG. 2 is a sectional view along a land or a groove. Referring to FIG. 2, information is sequentially recorded from the left to the right. In this embodiment, the groove portions are so formed that the positions of tracks on the transparent substrate 2 are consistent with the positions of tracks on the opposing substrate 3.

The transparent substrate 2 is usually made of a transparent resin such as polycarbonate. When a transparent resin like this is used, the pit 8a can be formed by embossing. Although the material of the opposing substrate 3 is not particularly restricted, the same material as the transparent substrate 2 is commonly used.

The recording layer 4 is, e.g., a thin metal film formed by sputtering, vapor deposition or the like on the surface of the transparent substrate 2 on which the pit 8a is formed. This recording layer 4 must be semitransparent, i.e., must have both light-reflecting and light-transmitting properties. Likewise, the recording layer 5 is a thin metal film formed by sputtering, vapor deposition or the like on the surface of the transparent substrate 3 on which the pit 8b is formed. This recording layer 5 need not be semitransparent and hence usually has specular reflecting properties. Metal materials such as aluminum and gold can be used as these recording layers 4 and 5.

The interlayer 6a is made from a third-order nonlinear optical material. This third-order nonlinear optical material nonlinearly changes its optical characteristics when irradiated with light. When a third-order nonlinear optical material which increases its refractive index when the intensity of irradiating light increases is used as the interlayer 6a, the refractive index of that portion of the interlayer 6a, which is irradiated with the laser beam 7, becomes larger than the refractive index of that portion of the interlayer 6a, which is not irradiated with the laser beam 7. Note that the intensity of the laser beam 7 has Gaussian distribution, which is lowered from the center to the periphery. Accordingly, the refractive index of that portion of the interlayer 6a which is irradiated with the laser beam 7 is a maximum at the center.

When such a refractive index gradient exists in the interlayer 6a, the laser beam 7 transmitted through the recording layer 4 arrives at the recording layer 5 by the same principle as an optical waveguide, i.e., by self-focusing, with almost no change in its beam diameter. In other words, the laser beam 7 is focused on both the recording layers 4 and 5. By the same principle, the laser beam 7 reflected by the recording layer 5 arrives at the recording layer 4 with almost no change in its beam diameter. A partial light component of the laser beam 7 reflected by the recording layer 5 is transmitted through the recording layer 4, while the remaining light component is reflected by it. Since, however, the laser beam 7 does not diffuse in the interlayer 6a as described above, all light components of the laser beam 7 reflected by the recording layer 5 are finally transmitted through the recording layer 4.

As described above, the reflected light from the optical disk 1 contains the reflected light from the recording layer 5, as light having enough intensity change to read out information recorded in the recording layer 5, rather than as noise. Also, since the laser beam 7 is focused on the recording layer 4, the reflected light from the optical disk 1 contains the reflected light from the recording layer 4 as light having enough intensity change to read out information recorded in the recording layer 4. Accordingly, if the intensity of the reflected light from the optical disk 1 changes between four values in accordance with combinations (0,0), (1,0), (0,1), and (1,1) of information recorded in the recording layer 4 and information recorded in the recording layer 5 and if these four values are distinguishably different from each other, it is possible to read out information recorded in the recording layers 4 and 5 at the same time.

The third-order nonlinear optical material used as the interlayer 6a can be either resonant or nonresonant. As a resonant third-order nonlinear optical material, it is possible to use, e.g., a $ZnS/SiO_2$ mixture having a ZnS quantum dot (0th-order nanocrystal) in $SiO_2$ matrix structure. Note that the material of a semiconductor quantum dot structure is a typical third-order nonlinear optical material. It is also possible to use the material of a semiconductor quantum dot structure having a semiconductor below as a dot: compound semiconductors of group II atoms and group VI atoms, such as CdSe, CdS, ZnSe, ZnS, ZnO, and their mixtures; compound semiconductors of group III atoms and group V atoms, such as GaAs, AlAs, InAs, GaP, InP, AlP, and their mixtures; semiconductors of group IV atoms, such as C, Si, Ge, and their mixtures; CuCl and the like.

An example of the nonresonant third-order nonlinear optical material used as the interlayer 6a is a material formed by adding an organic nonlinear optical material, such as a π-conjugated organic material or a σ-conjugated organic material, to a glass material. Examples of this organic material are urea [$CO(NH_2)_2$], saccharose [$C_{12}H_{22}O_{11}$], POM [3-methyl-4-nitropyridine-1-oxide], MAP [methyl-(2, 4-dinitrophenyl)-amino-2-propanoate], MNA [2-methyl-4-nitroaniline], mNA [meta-nitroaniline], KM [potassium malate], MDB [meta-dinitrobenzene], LAP [L-argine phosphate], DLAP [deuterated L-arginine phosphate], DNA [3-acetamide-4-dimethylamino-nitrobenzene], polysilane, $C_{60}$, $C_{70}$, $BiI_3$, $LiNbO_3$, $LiTaO_3$, KTP [$KTiOPO_4$: potassium titanyl phosphate], KDP [$KH_2PO_4$: potassium dideuterium phosphate], KD*P [$KD_2PO_4$], ADP [$NH_4H_2PO_4$: ammonium dihydrogen phosphate], and β-BBO [β-$BaB_2O_4$: betabarium borate]. When such a nonresonant third-order nonlinear optical material is used, a lowering of the intensity of the laser beam 7 in this interlayer 6a can be suppressed.

As the interlayer 6a, it is also possible to use organic materials such as polyacetylene, poly(ketene), poly(phenylacetylene), poly(p-phenylene vinylene), polyquinonxaline, polyaniline, polydiacetylene, eosine, fluoresceine, carbon disulfide, acridine yellow, and methyl red and inorganic materials such as fine cuprous chloride particles (particle size 10 to 100 Å).

To simultaneously read out information recorded in the recording layers 4 and 5 of the optical disk 1 described above, the reflected light from the optical disk 1 desirably has sufficiently high intensity. That is, the reflected light from the recording layer 4 desirably has sufficient intensity, and the reflected light from the recording layer 5 desirably has sufficient intensity even after being transmitted through the recording layer 4. Therefore, a reflectance x of the recording layer 4 alone and a reflectance y of the recording layer 5 alone preferably satisfy:

$0.1 < x < 0.4$, and $0.5 < y \leq 1$

Also, to simultaneously read out information recorded in the recording layers 4 and 5 as described above, the intensity of the reflected light from the optical disk 1 must change between four values. That is, the intensity of the reflected light from the optical disk 1 must change between four values $I_{00}$, $I_{10}$, $I_{01}$, and $I_{11}$ in accordance with (0,0), (1,0), (0,1), and (1,1) as combinations of information "0" and "1" recorded in the recording layer 4 and information "0" and "1" recorded in the recording layer 5.

For example, when portions where pits 8a and 8b are formed correspond to information "0" and portions where pits 8a and 8b are not formed correspond to information "1", the reflected light intensities $I_{00}$, $I_{10}$, $I_{01}$, and $I_{11}$ have the following relationships:

$I_{00} < I_{10} < I_{11}$, and $I_{00} < I_{01} < I_{11}$

However, the relationship between the reflected light intensities $I_{10}$ and $I_{01}$ can vary in accordance with the reflectances x and y. Therefore, to make the reflected light intensities $I_{10}$ and $I_{01}$ different from each other, it is preferable to appropriately control the reflectances x and y. For example, assuming that the ratio at which incident light attenuates in the pit 8a and the ratio at which it attenuates in the pit 8b are equal and that no light absorption occurs, the reflected light intensities $I_{10}$ and $I_{01}$ can be made different if the reflectances x and y satisfy:

$(1-x) \cdot y \neq x$

In the above discussion, light absorption in the recording layer 4 and the like is not taken into consideration. However, the amount of light absorption in the recording layer 4 and the like can be readily calculated by using an extinction coefficient used in calculation of a complex index of refraction.

The reflectances x and y can be controlled by the types of materials of the recording layers 4 and 5 and the thicknesses of these layers. For example, when the wavelength of the laser beam 7 is 650 or 410 nm and the recording layers 4 and 5 are made of aluminum, the thickness of the recording layer 4 is preferably 2 to 8 nm, and the thickness of the recording layer 5 is preferably 100 nm or more. When the wavelength of the laser beam 7 is 650 nm and the recording layers 4 and 5 are made of gold, the thickness of the recording layer 4 is preferably 5 to 10 nm, and the thickness of the recording layer 5 is preferably 12 nm or more. When the wavelength of the laser beam 7 is 410 nm, a thin gold film 10 to 200 nm thick can be used as the recording layer 4. However, no gold is generally used as the recording layer 5. This is so because if gold is used as the recording layer 5 when the wavelength of the laser beam 7 is 410 nm, the reflectance required for the recording layer 5 is difficult to obtain.

Instead of varying the intensity of the reflected light from the optical disk 1 between four values by controlling the reflectances x and y, the diameters of the pits 8a and 8b can be made different from each other. It is also possible to combine the control of the reflectances x and y and the control of the diameters of the pits 8a and 8b. In any case, the intensity of the reflected light from the optical disk 1 can be varied between four values.

A reproducing method of the optical disk 1 will be described below.

Figure 3:
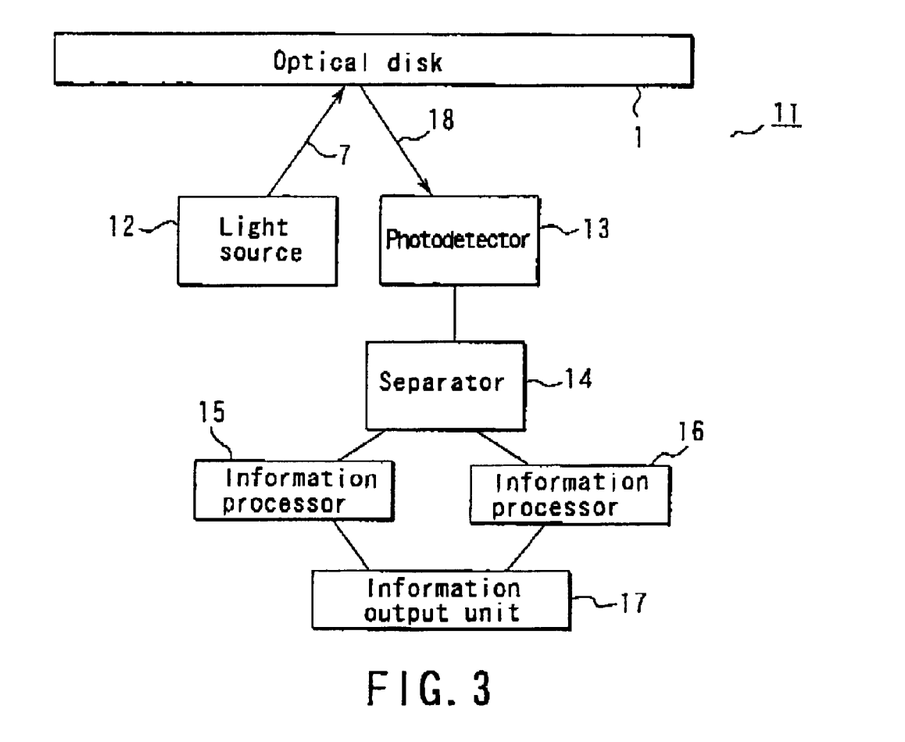
FIG. 3 is a view schematically showing a reproducing apparatus for the optical recording medium according to the first embodiment of the present invention.

FIG. 3 is a view schematically showing an optical disk reproducing apparatus according to the first embodiment of the present invention. A reproducing apparatus 11 shown in FIG. 3 has a light source 12, a photodetector 13, a data separator 14, information processors 15 and 16, and an information output unit 17. The optical disk 1 can be a disk removable from the reproducing apparatus 11 or can constitute a part of the reproducing apparatus 11.

The optical disk 1 is played back using the reproducing apparatus 11 by the following method.

First, the light source 12 irradiates that surface of the optical disk 1, which faces the substrate 2, with converged light as reproducing light 7. For example, this light source 12 has a laser and a lens for converging an output laser beam from the laser.

As described above, the intensity of reflected light 18 produced when the optical disk 1 is irradiated with the reproducing light 7 changes between four values. The photodetector 13 receives this reflected light 18 from the optical disk 1 and supplies data concerning the intensity of the reflected light 18 and the like to the data separator 14. Note that the photodetector 13 naturally can distinguish between the intensities of the reflected light 18 from the optical disk 1.

The data separator 14 separates the data from the photodetector 13 into data corresponding to information recorded in the recording layer 4 and data corresponding to information recorded in the recording layer 5. The data separator 14 supplies the data corresponding to information recorded in the recording layer 4 to the information processor 15 and the data corresponding to information recorded in the recording layer 5 to the information processor 16.

The information processors 15 and 16 process the supplied data by a predetermined method and supply the processed data to the information output unit 17. The information output unit 17 externally outputs the data from the information processor 15 and 16 as separate data, or as synthetic data. In this manner both pieces of information recorded in the recording layers 4 and 5 can be read out at the same time.

As described previously, the positions of tracks on the recording layer 4 are consistent with the positions of tracks on the recording layer 5. In this embodiment, therefore, tracking need only be performed for the recording layer 4.

In the above reproducing method, if recording modes of the recording layers 4 and 5 are different, separation of the data from the photodetector 13 is easy. For example, the data separation is easy when information is recorded by mark position modulation in one of the recording layers 4 and 5 and information is recorded by mark edge modulation in the other. In mark position modulation, the shape of a recording mark is constant, and pieces of information "0" and "1" are distinguished on the basis of the distance between the centers of adjacent recording marks. On the other hand, in mark edge modulation recording marks having different lengths are formed in accordance with information "0" and "1". In this case, the data can be separated more easily by making reference mark intervals (frequencies) of the recording layers 4 and 5 different from each other.

It is also possible to make recording formats of the recording layers 4 and 5 different from each other. Known recording formats are CAV (Constant Angular Velocity), CLV (Constant Linear Velocity), and ZCAV (Zoned CAV). In CAV and ZCAV, the rotating speed of an optical disk is constant when information is read out. Accordingly, the data can be easily separated when information is recorded by CLV in one of the recording layers 4 and 5 and information is recorded by ZCAV in the other.

In the first embodiment of the present invention as has been described above, the use of the interlayer 6a made of a third-order nonlinear optical material allows simultaneous read-out of both pieces of information recorded in the recording layers 4 and 5. In this embodiment, therefore, an information amount twice that in conventional methods can be read out within unit time. Also, in this embodiment it is unnecessary to move the focal position of a laser beam between the recording layers 4 and 5. This greatly increases the data access speed.

The second embodiment of the present invention will be described below.

Figure 4:
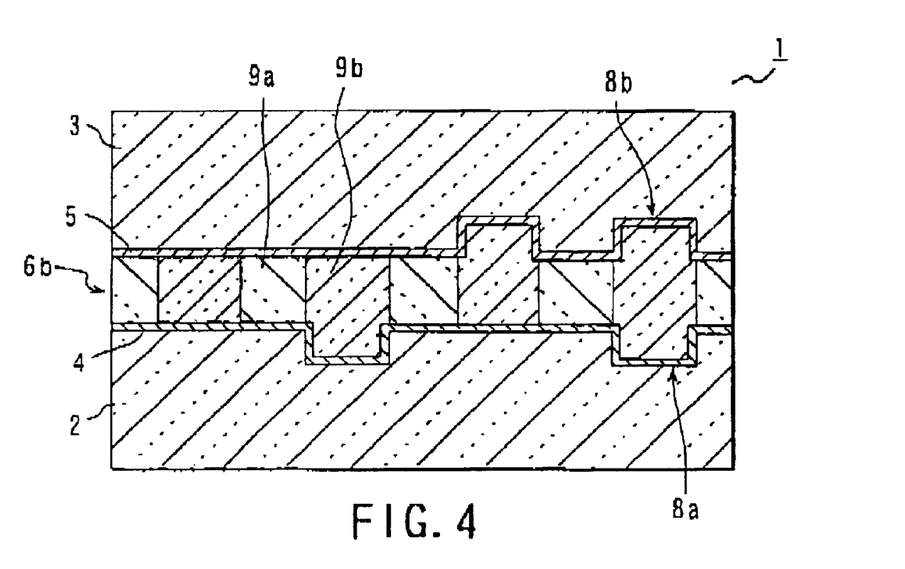
FIG. 4 is a sectional view schematically showing an optical recording medium according to the second embodiment of the present invention.

FIG. 4 is a sectional view schematically showing an optical recording medium according to the second embodiment of the present invention. An optical recording medium 1 shown in FIG. 4 is a single-sided, dual-layered read only optical disk. This optical disk 1 has a structure in which a transparent substrate 2 having a recording layer 4 on one principal surface and an opposing substrate 3 having a recording layer 5 on one principal surface are adhered via an interlayer 6b such that the recording layers 4 and 5 oppose each other. That is, the optical disk 1 shown in FIG. 4 differs from the optical disk shown in FIG. 2 in that the interlayer 6b is used in place of the interlayer 6a.

In this embodiment, pits 8a and 8b are formed by mark position modulation. These pits 8a and 8b are so formed that mark positions on the recording layer 4 and mark positions on the recording layer 5 are consistent with each other in a direction along tracks.

In the optical disk 1 according to this embodiment, the interlayer 6b has a low-refractive-index portion 9a as a first portion and a high-refractive-index portion 9b as a second portion. The high-refractive-index portion 9b has a higher refractive index than that of the low-refractive-index portion 9a. This high-refractive-index portion 9b is so formed as to connect the recording layers 4 and 5 in a position corresponding to a recording mark.

The interlayer 6b having such a structure functions as an optical waveguide, like the interlayer 6a in the first embodiment. Therefore, in this embodiment as well both pieces of information recorded in the recording layers 4 and 5 can be read out at the same time, as in the first embodiment.

This interlayer 6b is not particularly restricted as long as the layer has the low-refractive-index portion 9a and the high-refractive-index portion 9b described above. The interlayer 6b having these low-refractive-index portion 9a and high-refractive-index portion 9b can be formed by, e.g., forming a thin film by using optical heat-resistant photosensitive polyimide or photosensitive oxygen-crosslinked polysilane and exposing a portion corresponding to the high-refractive-index portion 9b to light. The interlayer 6b having the low-refractive-index portion 9a and the high-refractive-index portion 9b can also be formed by forming a thin transparent film and implanting ions into a portion of the film.

In the above first and second embodiments, the read only optical disks 1 have been described. However, the optical recording medium of the present invention can also be a write-once or rewritable optical recording medium. For example, the recording layer 4 can be a phase change layer that allows rewriting of information, while the recording layer 5 is a read only layer. Also, in each of the first and second embodiments described above, the optical disk 1 has the two recording layers 4 and 5. However, the optical recording medium of the present invention can have three or more recording layers.

Examples of the present invention will be described below.

EXAMPLE 1

An optical disk 1 shown in FIG. 2 was manufactured as follows.

First, recording marks corresponding to information "1", "0", "1", and "0" were formed on one principal surface of a polycarbonate substrate 2. That is, no pits 8a were formed in the positions of recording marks corresponding to information "1", and 160-nm deep pits 8a were formed in the positions of recording marks corresponding to information "0". Subsequently, on the surface of this substrate 2 on which these recording marks were formed, a 10-nm thick gold recording layer 4 was formed by vapor deposition.

The reflectance was measured by irradiating the substrate 2 with a 650-nm laser beam by using a semiconductor laser from the surface away from the surface on which the recording layer 4 was formed. As a consequence, the reflectance was 30% when positions where no pits 8a were formed were irradiated with the laser beam. Also, a light loss of 30% was produced when positions where the pits 8a were formed were irradiated with the laser beam.

Subsequently, recording marks corresponding to information "1", "1", "0", and "0" were formed on one principal surface of a polycarbonate substrate 3. Note that no pits 8b were formed in the positions of recording marks corresponding to information "1", and 160-nm deep pits 8b were formed in the positions of recording marks corresponding to information "0". On the surface of this substrate 3 on which the recording marks were formed, a 5-nm thick aluminum recording layer 5 was formed by vapor deposition.

The reflectance was measured by irradiating the substrate 3 with a 650-nm laser beam by using a semiconductor laser from the surface away from the surface on which the recording layer 5 was formed. As a consequence, the reflectance was 30% when positions where no pits 8b were formed were irradiated with the laser beam. Also, a light loss of 30% was produced when positions where the pits 8b were formed were irradiated with the laser beam.

The substrates 2 and 3 were then adhered such that the recording layers 4 and 5 opposed each other by using an adhesive formed by adding MNA at a concentration of 20% to DESOLITE as an acrylic resin manufactured by JSR CORP. Note that the thickness of this adhesive layer, i.e., the thickness of an interlayer 6a was 400 μm.

Reflectances presumably observed when the optical disk 1 shown in FIG. 2 manufactured as above is irradiated with a 650-nm laser beam from a semiconductor laser such that the beam is focused on the recording layer 4 were calculated.

The results are shown in Table 1 below.

TABLE 1

| Information recorded in recording layer 4 | Information recorded in recording layer 5 | Reflectance (%) |
|---|---|---|
| 1 | 1 | 60 |
| 0 | 1 | 55 |
| 1 | 0 | 47 |
| 0 | 0 | 42 |

Also, the apparatus shown in FIG. 3 was used to irradiate this optical disk 1 with a 650-nm laser beam from a semiconductor laser such that the beam was focused on the recording layer 4, thereby reading out the information recorded in the optical disk 1. The results are shown in FIG. 5.

Figure 5:
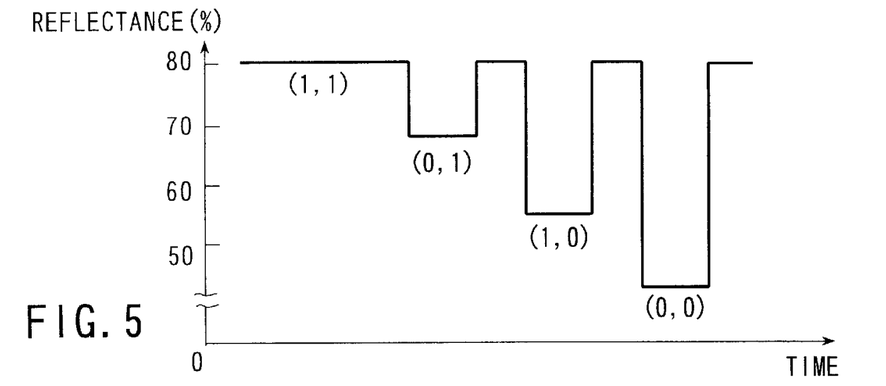
FIG. 5 is a graph showing reflectance data obtained for an optical recording medium according to Example 1 of the present invention.

FIG. 5 is a graph showing the reflectance data obtained for the optical disk 1 according to Example 1 of the present invention. Referring to FIG. 5, the abscissa indicates time, and the ordinate indicates the reflectance. Measured values of the reflectance shown in FIG. 5 are substantially equal to the calculated values shown in Table 1 above. That is, in this example the reflectance varied between four values and these four values were distinguishably different from each other. In this example, therefore, both pieces of information recorded in the recording layers 4 and 5 could be read out at the same time.

Comparative example

An optical disk 1 was manufactured following the same procedures as in Example 1 above except that no MNA was added to an interlayer 6a. Reflectances presumably observed when this optical disk 1 is irradiated with a 650-nm laser beam from a semiconductor laser such that the beam is focused on a recording layer 4 were calculated. The results are shown in Table 2 below.

TABLE 2

| Information recorded in recording layer 4 | Reflectance (%) |
|---|---|
| 1 | 30 |
| 0 | 21 |

Also, the apparatus shown in FIG. 3 was used to irradiate this optical disk 1 with a 650-nm laser beam from a semiconductor laser such that the beam was focused on the recording layer 4, thereby reading out information recorded in the optical disk 1. The results are shown in FIG. 6.

Figure 6:
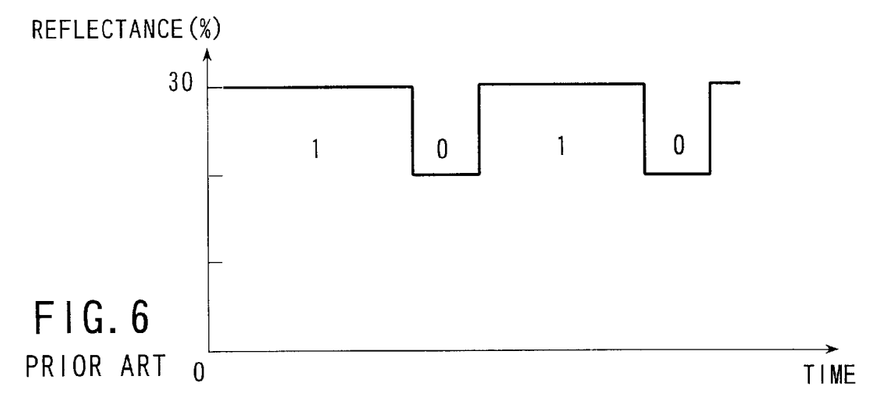
FIG. 6 is a graph showing reflectance data obtained for a conventional optical disk according to a comparative example.

FIG. 6 is a graph showing the reflectance data obtained for the conventional optical disk according to this comparative example. Referring to FIG. 6, the abscissa indicates time, and the ordinate indicates the reflectance. Measured values of the reflectance shown in FIG. 6 are substantially equal to the calculated values shown in Table 2 above. That is, in this comparative example the reflectance varied between two values in accordance with information recorded in the recording layer 4. Consequently, information recorded in a recording layer 5 could not be read out.

It is evident from the comparison of FIGS. 5 and 6, the information amount that can be read out within a predetermined time in Example 1 is twice the information amount that can be read out within the predetermined time in Comparative Example 1. Also, in Comparative Example 1 the focal position of a laser beam must be moved between the recording layers 4 and 5. Accordingly, in practice information can be read out from the optical disk 1 according to Example 1 at a speed more than twice the speed at which information is read out from the conventional disk according to this comparative example.

Example 2

An optical disk 1 shown in FIG. 4 was manufactured as follows.

First, following the same procedures as in Example 1, recording marks were formed on one principal surface of a polycarbonate substrate 2, and a 10-nm thick gold recording layer 4 was formed by vapor deposition. Subsequently, following the same procedures as in Example 1, recording marks were formed on one principal surface of a polycarbonate substrate 3, and a 5-nm thick aluminum recording layer 5 was formed by vapor deposition.

After that, the recording layer 5 was coated with water glass, as an adhesive, containing methyl acrylate at a concentration of 40%. Additionally, this coating film was exposed to UV except for portions corresponding to the recording marks. This polymerized the methyl acrylate monomer in the exposed portions of the coating film, thereby lowering the refractive index of the exposed portions. In this way an interlayer 6b having a low-refractive-index portion 9a and a high-refractive index portion 9b was formed.

Subsequently, the substrates 2 and 3 were adhered such that the interlayer 6b came in contact with the recording layer 4, and this interlayer 6b was dried. In this manner the optical disk 1 having the 100-nm thick interlayer 6b was manufactured.

This optical disk 1 was evaluated following the same procedures as in Example 1. Consequently, as shown in FIG. 5, the reflectance varied between four values, and these four values were distinguishably different from each other. Accordingly, in this example it was possible to simultaneously read out both pieces of information recorded in the recording layers 4 and 5.

Example 3

An optical disk 1 shown in FIG. 2 was manufactured following the same procedures as in Example 1. This example differs from Example 1 in that the frequency of recording marks in a recording layer 4 was made different from the frequency of recording marks in a recording layer 5. That is, in this example recording marks were formed at 12 and 7 MHZ in the recording layers 4 and 5, respectively.

This optical disk 1 was irradiated with a laser beam following the same procedure as in Example 1, and the reflected light was converted into an electrical signal. This electrical signal was separated by using a bandpass filter. Consequently, both pieces of information recorded in the recording layers 4 and 5 could be individually read out.

Example 4

Figure 7:
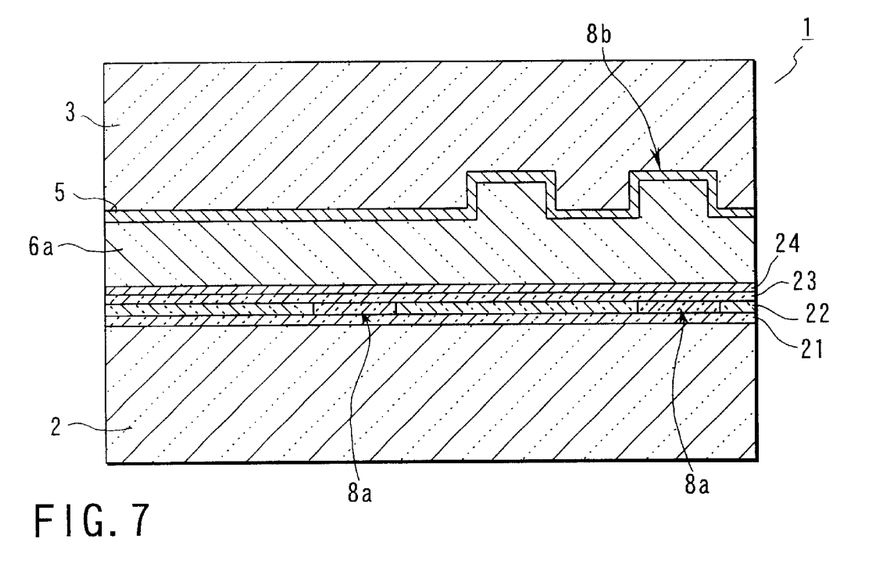
FIG. 7 is a sectional view schematically showing an optical disk according to Example 4 of the present invention.

FIG. 7 is a sectional view schematically showing an optical disk according to Example 4 of the present invention. An optical disk 1 shown in FIG. 7 has a rewritable recording layer 22 and a read only recording layer 5.

This optical disk 1 shown in FIG. 7 was manufactured as follows.

First, following the same procedures as in Example 1, recording marks were formed on one principal surface of a polycarbonate substrate 3, and a 10-nm thick aluminum recording layer 5 was formed.

Subsequently, on one principal surface of a polycarbonate substrate 2, a 10-nm thick ZnS/SiO$_2$ protective layer 21, a 20-nm thick GeSbTe phase change recording layer 22, a 10-nm thick ZnS/SiO$_2$ protective layer 23, and a 3-nm thick aluminum semitransparent reflecting layer 24 were sequentially formed. Although the protective layers 22 and 23 are not essential components, they are effective to prevent evaporation of the phase change recording layer 22 upon irradiation with a laser beam.

After that, acridine yellow was added at a concentration of 20 wt % to DESOLITE as an acrylic resin available from JSR CORP. The obtained mixture was used as an adhesive to adhere the substrates 2 and 3 such that the semitransparent reflecting layer 24 and the recording layer 5 opposed each other. Note that the thickness of the adhesive layer, i.e., the thickness of an interlayer 6a was 55 μm. In this manner, the optical disk 1 shown in FIG. 7 was manufactured.

Subsequently, the entire surface of this optical disk 1 was irradiated with a laser beam having higher intensity than that of reproducing light from the side of the substrate 2, thereby crystallizing the phase change recording layer 22. That is, initial crystallization was performed. Furthermore, the optical disk 1 was irradiated with a pulse-like laser beam having higher intensity than that of the laser beam used in the initial crystallization from the side of the substrate 2. Consequently, the irradiated portion of the phase change recording layer 22 melted and rapidly cooled down to form amorphous recording marks 8a.

This optical disk 1 having the recording marks 8a thus formed in the phase change recording layer 22 was evaluated following the same procedures as in Example 1. Consequently, as shown in FIG. 5, the reflectance varied between four values, and these four values were distinguishably different from each other. Accordingly, in this example it was possible to simultaneously read out both pieces of information recorded in the phase change recording layer 22 and the recording layer 5.

In the present invention as has been described above, converged light irradiating a first recording layer is guided to a second recording layer such that the beam diameter of the light on the first recording layer is substantially equal to that of the light on the second recording layer. This makes it possible to simultaneously read out both pieces of information recorded in the first and second recording layers. In the present invention, therefore, an information amount twice that in conventional methods can be read out within unit time. Also, in the present invention it is unnecessary to move the focal position of a laser beam between the first and second recording layers. This greatly increases the speed of access to data. That is, the present invention can rapidly read out information recorded in a single-sided, multilayered optical recording medium.

Furthermore, the present invention eliminates the need for a mechanism for moving the focal position of a laser beam between the first and second recording layers. This can simplify the structure of a reproducing apparatus. That is, the present invention can reduce the cost and time required for the manufacture of a reproducing apparatus for a single-sided, multilayered optical recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical recording medium using a reflectance difference to reproduce recorded information comprising:

a first recording layer;

an interlayer provided on one principal surface of said first recording layer; and a second recording layer provided on said interlayer, wherein said interlayer guides converged light irradiating and focused on said first recording layer to said second recording layer such that a beam diameter of the light on said second recording layer is substantially equal to a beam diameter of the light on said first recording layer.

2. A medium according to claim 1, wherein a reflectance $R_1$ of said first recording layer and a reflectance $R_2$ of said second recording layer satisfy:

$0.1 < R_1 < 0.4$, $0.5 < R_2 \leq 1$, and $R_2 \neq R_1/(1-R_1)$.

3. A medium according to claim 1, wherein pieces of information are recorded in both of said first and second recording layers, and a recording density in said first recording layer differs from a recording density in said second recording layer.

4. A medium according to claim 1, wherein said interlayer is made of a third-order nonlinear optical material.

5. A medium according to claim 1, wherein said interlayer comprises first and second portions juxtaposed on said first recording layer, said second portion having a higher refractive index than that of said first portion.

6. A medium according to claim 5, wherein said second recording layer has a recording mark, and said second portion is formed in a position of the recording mark.

7. An optical recording medium using a reflectance difference to reproduce recorded information, comprising:

a first recording layer;

an interlayer provided on one principal surface of said first recording layer and made of a third-order nonlinear optical material; and a second recording layer provided on said interlayer.

8. An optical recording medium using a reflectance difference to reproduce recorded information, comprising:

a first recording layer;

an interlayer provided on one principal surface of said first recording layer; and a second recording layer provided on said interlayer, wherein said interlayer comprises first and second portions juxtaposed on said first recording layer, and a refractive index of said second portion is higher than that of said first portion.

9. A reproducing method of an optical recording medium comprising a first recording layer, an interlayer provided on one principal surface of said first recording layer, and a second layer provided on said interlayer, comprising:

irradiating said first recording layer with converged light; and detecting intensity of reflected light produced by irradiation of the converged light, wherein said interlayer guides the converged light irradiating and focused on said first recording layer to said second recording layer such that a beam diameter of the light on said second recording layer is substantially equal to a beam diameter of the light on said first recording layer.

10. A method according to claim 9, wherein the intensity of the reflected light varies between at least four values.

11. A method according to claim 10, further comprising separating, on the basis of the at least four values, data obtained by detecting the intensity of the reflected light in accordance with information recorded in said first recording layer and information recorded in said second recording layer.

12. A method according to claim 11, wherein said first and second recording layers are different in at least one of a recording density and a recording mode, and the data is separated by using the difference in at least one of a recording density and a recording mode between said first and second recording layers.

13. A reproducing apparatus of an optical recording medium having a structure in which a plurality of recording layers are stacked, comprising:

an optical recording medium comprising a first recording layer, an interlayer provided on one principal surface of said first recording layer, and a second recording layer provided on said interlayer;

a light source irradiating said first recording layer with converged light; and a detector detecting intensity of reflected light produced by irradiation of the light, wherein said interlayer guides the converged light irradiating and focused on said first recording layer to said second recording layer such that a beam diameter of the light on said second recording layer is substantially equal to a beam diameter of the light on said first recording layer.

14. An apparatus according to claim 13, wherein pieces of information are recorded in said first and second recording layers, and a recording density in said first recording layer differs from a recording density in said second recording layer.

15. An apparatus according to claim 13, wherein said interlayer is made of a third-order nonlinear optical material.

16. An apparatus according to claim 13, wherein said interlayer comprises first and second portions juxtaposed on said first recording layer, and a refractive index of said second portion is higher than that of said first portion.

17. An apparatus according to claim 16, wherein said second recording layer has a recording mark, and said second portion is formed in a position of the recording mark.

18. An apparatus according to claim 13, wherein the intensity of the reflected light varies between at least four values, and said apparatus further comprises a data separator X separating, on the basis of the at least four values, data obtained by detecting the intensity of the reflected light in accordance with data recorded in said first recording layer and data recorded in said second recording layer.

19. An optical recording medium using a reflectance difference to reproduce recorded information comprising:

a first recording layer;

an interlayer provided on one principal surface of said first recording layer; and a second recording layer provided on said interlayer;

wherein said interlayer guides converged light irradiating said first recording layer to said second recording layer such that a beam diameter of the light on said second recording layer is substantially equal to a beam diameter of the light on said first recording layer; and wherein a reflectance $R_1$ of said first recording layer and a reflectance $R_2$ of said second recording layer satisfy $0.1 < R_1 < 0.4$, $0.5 < R_2 \leq 1$, and $R_2 \neq R_1/(1-R_1)$.

20. A medium according to claim 7, wherein a reflectance $R_1$ of said first recording layer and a reflectance $R_2$ of said second recording layer satisfy:

$0.1 < R_1 < 0.4$, $0.5 < R_2 \leq 1$, and $R_2 \neq R_1/(1-R_1)$.

21. A medium according to claim 8, wherein a reflectance $R_1$ of said first recording layer and a reflectance $R_2$ of said second recording layer satisfy:

$0.1 < R_1 < 0.4$.

$0.5 < R_2 \leq 1$, and $R_2 \neq R_1/(1-R_1)$.

22. A method according to claim 9, wherein a reflectance $R_1$ of said first recording layer and a reflectance $R_2$ of said second recording layer satisfy:

$0.1 < R_1 < 0.4$, $0.5 < R_2 \leq 1$, and $R_2 \neq R_1/(1-R_1)$.

23. An apparatus according to claim 13, wherein a reflectance $R_1$ of said first recording layer and a reflectance $R_2$ of said second recording layer satisfy:

$0.1 < R_1 < 0.4$, $0.5 < R_2 \leq 1$, and $R_2 \neq R_1/(1-R_1)$.

* * * * *